United States Patent Office 3,426,104
Patented Feb. 4, 1969

3,426,104
DYE RECEPTIVE ACRYLONITRILE POLYMERS COMPRISING COPOLYMERIZED ALKYL ALLYLOXY BENZENE SULFONATES
James C. Masson, Chapel Hill, N.C., assignor to Monsanto Chemical Company, St. Louis, Mo., a corporation of Delaware
No Drawing. Continuation-in-part of application Ser. No. 219,761, Aug. 27, 1962. This application Sept. 28, 1965, Ser. No. 491,005
U.S. Cl. 260—895       22 Claims
Int. Cl. C08f 15/32

ABSTRACT OF THE DISCLOSURE

Acrylonitrile polymer compositions are copolymerized with alkyl allyloxybenzenesulfonates and then extruded to form fibers having improved basic dye receptivity.

---

This is a continuation-in-part of application Ser. No. 219,761 filed Aug. 27, 1962, now abandoned.

This invention relates to dyeable acrylonitrile polymers and blends thereof. More particularly, the invention relates to the use of β-alkyl allyloxybenzene sulfonates as basic dye receptive monomers for acrylonitrile polymerizations.

Acrylonitrile polymers prepared with certain redox initators have a limited dyeability with basic (cationic) dyes. In order to increase this dyeability, various means have been employed, such as copolymerization with an acidic monomer. For example, sodium p-methacrylamidobenzenesulfonate, sodium styrenesulfonate, sodium methallylsulfonate, and itaconic acid have all been copolymerized with acrylonitrile to improve the dyeability of the resulting polymer, and ultimately, fiber. Unfortunately, many of the dye receptive monomers described in the prior art do not copolymerize well with acrylonitrile; others, though being readily incorporated, tend to cause discoloration of the resultant fibers. Preparation of many of the dye receptive monomers described in the prior art involves laborious procedures or requires uncommon and hence expensive starting materials.

Accordingly, it is an object of the present invention to provide new compositions of matter. It is another object of the invention to provide acrylonitrile polymers containing β-alkyl and α,β-dialkyl allyloxybenzenesulfonic acids and sulfonate salts which improve the basic dyeability thereof. It is an additional object of the invention to provide fibers, films, and filaments prepared from acrylonitrile polymers containing β-alkyl and α,β-dialkyl allyloxybeneze sulfonic acids and sulfonates. It is still another object of the invention to provide a process for preparing dyeable acrylonitrile polymers containing β-alkyl and α,β-dialkyl allyloxybenzenesulfonic acids and sulfonates. Other objects and advantages will become apparent from the description hereafter.

The objects of this invention are accomplished by the polymerization of β-alkyl and α,β-dialkyl allyloxybenzenesulfonic acids and sulfonate with various acrylonitrile compositions. The alkyl allyloxybenzenesulfonates, as they will be referred to hereafter, have the general formula:

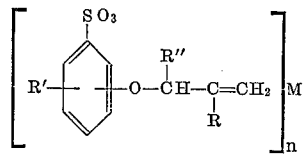

wherein R is lower alkyl of 1 to 6 carbon atoms, R' and R" may be hydrogen or lower alkl of 1 to 6 carbon atoms, M represents hydrogen, a mono or divalent salt forming member, for example an alkali metal cation such as lithium, sodium, potassium, cesium, or budidium ions, an alkaline earth cation such as beryllium, magnesium, calcium, strontium or barium ions, a non-metallic cation such as ammonium ion, and the like and n is an integer equal to the valence of the cation M.

Compounds which are embraced by the general formula of the invention include soduim p-ethallyloxybenzenesulfonate, sodium p-propallyloxybenzenesulfonate, potassium p-ethallyloxybenzenesulfonate, lithium p-ethallyloxybenzenesulfonate, sodium p-methallyloxybenzenesulfonate, sodium 2 - ethyl - 4 - ethallyloxybenzenesulfonate, sodium 2-propyl-4-methallyloxybenzenesulfonate, sodium 3-methyl-4-methallyloxybenzenesulfonate, potasssium p-methallyloxybenzenesulfonate, potassium p-propallyloxybenzenesulfonate, potassium 2-ethyl-4-methallyloxybenzene sulfonate, ammonium p-methallyloxybenzenesulfonate, barium p-methallyloxybenzenesulfonate, magnesium p-methallyloxybenzenesulfonate, calcium p-methallyloxybenzenesulfonate, sodium m-methallyloxybenzenesulfonate, potassium m-methallyloxybenzenesulfonate, lithium m-methallyloxybenzenesulfonate, magnesium m-methallyloxybenzenesulfonate, calcium m-methallyloxybenzenesulfonate, barium m-methallyloxybenzenesulfonate, sodium o-methallyloxybenzenesulfonate, potassium o-methallyloxybenzenesulfonate, magnesium o-methallyloxybenzenesulfonate, ammonium o-methallyloxybenzenesulfonate, sodium 2-methyl-4-methallyloxybenzensulfonate, sodium 2 - methyl-3-methallyloxybenzenesulfonate, sodium 4-methyl-3-methallyloxybenzenesulfonate, sodium 5-methyl - 3 - methallyloxybenzenesulfonate, sodium 2-methyl-5-methallyloxybenzenesulfonate, sodium 5-methyl-2 - methallyloxybenzenesulfonate, sodium 5 - methyl - 2-methallyloxybenzenesulfonate, sodium 6-methyl-2-methallyloxybenzenesulfonate and the like.

These alkyl allyloxybenzene sulfonates may be prepared by what is commonly known as the Williamson ether synthesis which employs alkyl halides and alkali metal alkoxides in the preparation of ethers. The reaction may be represented as follows:

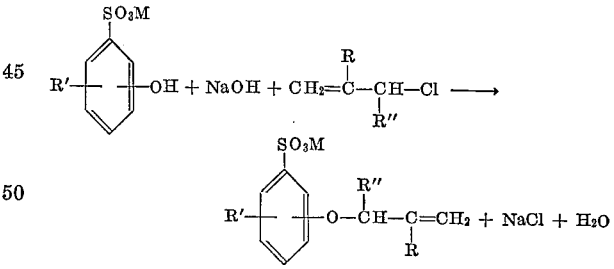

where M, R, R', and R" have the significance previously noted. In this synthesis, a slurry of any water soluble alkali metal salt of a phenol sulfonic acid is prepared at room temperature. The slurry is then made basic by addition of slightly more than one equivalent (based on phenol) of strong base; this will ensure that the solution remains basic throughout the reaction. Strong bases including alkali metal hydroxides such as sodium hydroxide, lithium hydroxide and potassium hydroxide are satisfactory. The slurry is then stirred to form a homogeneous solution to which is added an alkylallyl halide. A slight molar excess of the alkylallyl halide based on the phenol sufonate is preferred in order to utilize the maximum amount of the phenol sulfonate. Optionally, an organic solvent miscible with water and inert in the reaction may be added to increase the solubility of alkylallyl halide in the aqueous phase; acetone is suitable for this purpose. The reaction mixture is then heated with stirring at reflux temperature. The reflux temperature will, of course, be the boiling point of the lowest boiling component or azeotrope of the mixture, for example 62° C. in the case of methallyl chloride. The reaction takes place mainly at the interface with the rate of reaction depending upon the amount of agitation. The more vigorous the stirring, the faster is the reaction due to the increased interfacial area. The ether as formed is relatively insoluble in the reaction mixture and therefore settles out as the reaction proceeds and is easily recovered. If an organic solvent is used, it must be removed by distillation to recover the product in good yield. The ether is separated and dried by any convenient means, and the resulting compound is pure with very little unreacted phenol sulfonate being present.

The basic dye receptive monomers of this invention may be employed within a wide range, the exact amount depending on the amount of basic dye acceptance desired. In general, it may be said that these monomers may be employed in an amount ranging from about 0.10 to 10 percent based on monomer weight. Preferably, the amount of dye receptive monomer employed should be less than 1 percent, from about 0.3 to 0.6 percent being found quite satisfactory for most compositions. Any suitable polymerization process known in the prior art may be used, such as mass solution or aqueous emulsion polymerization procedures. However, the preferred practice is suspension polymerization. A semi-batch procedure may be employed wherein the polymerization vessel is charged with water, suspending agent, if desired and mineral acid to adjust the pH. The reactor is heated to the desired polymerization temperature and the system purged with an inert gas.

Aqueous feeds containing the initiators, buffering agents, and alkyl allyloxybenzenesulfonate as well as the acrylonitrile feed are metered into the reactor over a several hour interval. When feed addition is complete, the reactor contents are filtered and washed with water. The continuous polymerization procedure differs from the above in that the reactor is continuously charged with the feeds containing the monomers, initiators and buffering agents and the polymer is continuously withdrawn by means of an overflow port.

The acrylonitrile polymers which are obtained in the practice of the present invention are copolymers of acrylonitrile and an alkyl allyloxybenzenesulfonate, terpolymers and tetrapolymers containing additionally, other monomers copolymerizable with acrylonitrile, and blends comprising one of the above polymers with 2 to about 50 percent of another polymeric material, the blend or polymer having an overall polymerized acrylonitrile content of at least 80 percent by weight and from 0.10 and 10 percent of an alkyl allyloxybenzenesulfonate. While the preferred polymers employed in the instant invention are those containing at least 80 percent of acrylonitrile, generally recognized as the fiber-forming acrylonitrile polymers, it will be understood that the invention is likewise applicable to polymers containing less than 80 percent acrylonitrile and the same dyeability is realized with the dye receptive monomers defined herein. The acrylonitrile polymers containing less than 80 percent acrylonitrile are useful in forming fibers, films, coating compositions, molding compositions, lacquers, etc.

For example, the polymer may be a terpolymer of from 80 to 98 percent acrylonitrile, from 0.5 to 2 percent of an alkyl allyloxybenzenesulfonate, and up to 19.5 percent of another monomer containing the $>C=C<$ linkage, preferably vinyl acetate and copolymerizable with acrylonitrile.

The polymer may also be a tetrapolymer of 85 to 92.9 acrylonitrile, from 4 to 9 percent vinyl acetate, from 2 to 5 percent vinyl bromide and from 0.1 to 1.0 percent sodium methallyloxybenzenesulfonate. Suitable mono-olefinic monomers include methyl acrylate, methyl methacrylate, butyl methacrylate, methoxymethyl methacrylate, β-chloroethyl methacrylate, vinyl chloride, vinyl bromide, vinylidene chloride, methacrylonitrile, acrylamide, methacrylamide, α-chloroacrylamide, methyl vinyl ketone, vinyl carboxylates such as vinyl acetate, vinyl chloroacetate, vinyl propionate and vinyl stearate, N-vinylimides, such as N-vinylphthalimide and N-vinylsuccinimide, methylene malonic esters, N-vinylcarbazole, vinyl furane, alkyl vinyl esters, diethyl itaconate, styrene, vinyl naphthalene, vinyl substituted tertiary heterocyclic amines, such as the vinylpyridines and the alkyl substituted vinylpyridines, for example, 2-vinylpyridine, 4-vinylpyridine, 2-methyl-5-vinylpyridine, etc., and other $>C=C<$ containing polymerizable materials.

The polymer may be a quaternary interpolymer, for example, products obtained by the interpolymerization of acrylonitrile, an alkyl allyloxybenzenesulfonate and two of the monomers enumerated in the above list.

The polymer may also be a blend of a copolymer of 90–99.9 percent acrylonitrile and 0.1–10 percent alkyl allyloxybenzenesulfonate or of a ternary interpolymer of from 80 to 98 percent acrylonitrile, from 0.1–1.0 percent alkyl allyloxybenzenesulfonate and from 1 to 19.9 percent of at least one other $>C=C<$ containing substance with from 2 to 50 percent of the weight of the blend of a copolymer of from 10 to 70 percent of acrylonitrile and from 30 to 90 percent of at least one other $>C=C<$ containing polymerizable monomer. Preferably, when the polymeric material comprises a blend, it will be a blend of a terpolymer of 90 to 98 percent acrylonitrile, from 2 to 9 percent of another mono-olefinic monomers, such as vinyl acetate, which is not receptive to dyestuff, and up to 1 percent of an alkyl allyloxybenezenesulfonate with sufficient amount of a copolymer of from 10 to 70 percent of acrylonitrile and from 30 to 90 percent of a vinyl-substituted tertiary heterocyclic amine, such as vinylpyridene or 1-vinylimidazole, to give a dyeable blend having an overall vinyl-substituted tertiary heterocyclic amine content of from 2 to 10 percent, based on the weight of the blend.

The acrylonitrile polymer compositions defined herein which contain in polymerized form the dye receptive monomers of this invention show a substantial improvement in basic dyeability compared to similar compositions without the dye receptive monomer. All types of basic or cationic dyes are satisfactorily absorbed by the compositions of this invention. This invention makes possible relatively large improvements in basic dye acceptance of acrylonitrile polymer compositions, such improvements being attained with a small amount of acidic monomer. The monomers employed are fairly inexpensive and result in an economical and feasible method of preparing dyeable acrylonitrile polymer compositions.

These polymers may be converted to articles of manufacture by conventional methods, for example, the wet-spinning and dry-spinning methods for the production of filaments and fibers. The fibers and filaments prepared in this manner will be found to have greatly improved affinity for basic dyes. If desirable, various additives such as light stabilizers, antistatic agents, optical brighteners, and the like may be added to the compositions of the invention by any convenient means.

In order to further illustrate the present invention and the advantages thereof, the following specific examples are given, it being understood that they are merely intended to be illustrative. In the examples and and elsewhere all parts, ratios, and percents are by weight unless otherwise indicated. The basic dye acceptance (BDA) of the acrylonitrile polymer compositions of this invention was measured using a procedure involving "Sevron blue 2G" dye (C.I. Basic Blue 22). The procedure consisted of mixing a buffered (pH 5.2) solution of the dye with the polymer in a sealed tube at 100° C. for 2 hours. A liquor polymer ratio of 40:1 was used. After filtering and washing, the filtrate was analyzed spectrophotometrically to determine the amount of dye remaining and from this the percentage of dye takeup was determined. This is referred to as the basic dye acceptance.

EXAMPLE I

A baffled two liter three-necked flask was equipped with a stirrer, thermometer and reflux condenser. The flask was charged with a solution of 232.2 gms. of hydrous sodium p-phenol sulfonate and 42 gms. of sodium hydroxide dissolved in 500 ml. of distilled water. Next, 113 gms. of methallyl chloride was added. The mixture was rapidly stirred while being heated at reflux (64° C.) for 5 hours. It was then cooled to 10° C. The precipitated product was filtered, washed with 50 ml. of cold water and dried in a 50° C. vacuum oven. The yield from the initial batch was 79.6 percent. The filtrate was concentrated under vacuum, cooled and treated as above to yield an additional 8.7 percent, giving a total yield of 88.3 percent of sodium p-methallyloxybenzenesulfonate. This compound was characterized as the S-benzylthiouronium salt, melting point 153 to 154° C. The theoretical values calculated for the formula $C_{18}H_{22}O_4N_2S$ were C, 54.80%; H, 5.62%; N, 7.10% and found C, 54.66%; H, 5.73%; and N, 7.00%.

EXAMPLE II

Ammonium p-methallyloxybenzenesulfonate was prepared as follows:

A 7.5 g. sample of sodium p-methallyloxybenzenesulfonate was dissolved in 200 ml. of distilled water. The solution was passed through an Amberlite IR–120 ion exchange column (strong cation, $H^+$ cycle) and recovered quantitatively. It was then passed through another IR–120 column ($NH_4^+$ cycle) to convert it to the ammonium salt. The monomer thus prepared was used without isolation. By use of the second IR–120 column with the appropriate cation, any water soluble salt of the alkyl allyloxybenzenesulfonic acids may be prepared.

EXAMPLE III

Sodium 5 - methyl - 2 - methallyloxybenzenesulfonate was prepared as follows:

Two hundred g. of p-cresol was sulfonated by slow addition of an equal weight of concentrated sulfuric acid while maintaining the reaction temperature at 65–70° C. When addition was complete, the temperature was raised to 102° C. for 140 minutes. After cooling, the product was diluted with water and neutralized to pH 3. After filtration and drying, a yield of 260 g. (67 percent) of sodium 2-hydroxy-5-methylbenzenesulfonate was obtained. One half mole (105 g.) of the sodium 2-hydroxy-5-methylbenzenesulfonate from the preceding reaction was dissolved in 220 ml. of water. Twenty g. sodium hydroxide, 220 ml. of acetone, and 60 g. (0.65 mole) of methallyl chloride were added. The mixture was refluxed with stirring for 12 hours. After standing overnight, the acetone and excess methallyl chloride was distilled. The aqueous solution was then chilled, and the resultant slurry filtered. The product was recrystallized from water to yield 66 g. (50 percent) of sodium 5-methyl-2-methallyloxybenzenesulfonate. Structure of the product was quantitatively verified by NMR spectroscopy. An S-benzylthiouronium salt was prepared. Theory for

$C_{19}H_{24}O_4N_2S$ is C, 55.85%; H, 5.92%; N, 6.86%. Found: C, 55.93%, H, 5.02%; N, 6.79%.

EXAMPLE IV

Sodium m-methallyloxybenzenesulfonate was prepared as follows:

A slurry of 120 g. (0.69 mole) of metanilic acid in 1800 ml. of water and 84 g. of concentrated sulfuric acid was stirred and chilled to 15° C. A solution of 47.7 g. of sodium nitrite in 400 ml. of water was added over one-half hour and stirring continued for an hour. The reaction mixture was then slowly heated to the boiling point in order to decompose the diazonium salt. Heating was continued until nitrogen evolution ceased. The reaction mixture was then cooled and adjusted to pH 4 by the addition of lead carbonate. The precipitated lead sulfate was filtered and the filtrate evaporated to dryness. The product was recrystallized from ethanol to yield 50 g. (37 percent) of sodium m-hydroxybenzenesulfonate.

The product was combined with 10.5 g. of sodium hydroxide, 110 ml. of water, 30.1 g. of methallyl chloride and 110 ml. of acetone. The mixture was refluxed with stirring for 12 hours; the acetone and excess methallyl chloride were then distilled. The product was isolated by saturating the aqueous solution with sodium chloride. The material was redissolved in water, treated with decolorizing charcoal, and salted out again to yield 24.8 g. of sodium m-methallyloxybenzenesulfonate. An S-benzylthiouronium salt was prepared. Theory for

$C_{18}H_{22}O_4N_2S$ is C, 54.80%; H, 5.62%, N, 7.10%. Found: C, 54.65%; H, 5.47%; N, 7.06%.

EXAMPLE V

In this example a semi-batch polymerization process was employed with the addition of monomers and initiators taking place over a two hour period. The polymerization vessel, was charged with part of the water called for in the recipe, heated to 50° C. with stirring and purged with nitrogen before and throughout the polymerization. The monomer feed contained 90 parts acrylonitrile and 9 parts vinyl acetate. One part sodium p-methallyloxybenzenesulfonate was added in an aqueous feed. One part potassium persulfate and one part sulfur dioxide (as sodium metabisulfite) were also added in aqueous feeds. Sufficient sulfuric acid was included in the bisulfite feed to give a polymerization pH of about 2.5. A 90 percent yield of white polymer was obtained with an $\eta_{sp}$ of 0.33 (25° C., 0.1 g./dl. DMF). This polymer had a basic dye acceptance of 15.5 percent.

EXAMPLE VI

A semi-batch procedure similar to that of Example V was employed. The monomer feed consisted of 80 parts acrylonitrile and 19.5 parts vinylidine chloride. Added as separate aqueous feeds were: 0.5 part sodium p-methallyloxybenzenesulfonate, 2 parts potassium persulfate, 2 parts sulfur dioxide (as sodium metabisulfite) and 0.5 p.p.m. iron. After the two hour addition period and one additional hour reaction time at 50° C., a white polymer was obtained in 74 percent yield with an $\eta_{sp}$ of 0.17, and a BDA of 16.1 percent.

EXAMPLE VII

A continuous polymerization process was used in this example. The polymerization vessel was filled with $5 \times 10^{-4}$ normal sulfuric acid containing the steady state amount of iron, purged with nitrogen and heated to 40° C. with stirring. The feeds consisted of: water, 500 parts; acrylonitrile, 90.5 parts; vinyl acetate, 9 parts; sodium p-methallyloxybenzenesulfonate, 0.5 part; potassium persulfate, 1.2 parts; sulfur dioxide, 2.4 parts; sodium bicarbonate, 2.5 parts; and iron, 0.15 p.p.m. The average residence time of the feeds in the reactor was 60 minutes. A 63.3 percent yield of white polymer of 0.17 $\eta_{sp}$ was obtained. Basic dye acceptance of the polymer was 19.0 percent.

EXAMPLE VIII

In this example, all polymers were prepared following the general procedure of Example VII. The monomer composition was 9 parts vinyl acetate, acidic monomer as indicated, and acrylonitrile to total 100 parts. A 1:2 potassium persulfate:sulfur dioxide ratio, 0.15 p.p.m. iron, a 60 minute residence time and 40° C. polymerization temperature were used in all cases. The table compares the BDA of polymers incorporating alkyl allyloxybenzenesulfonates with that of polymers containing a number of well known dye receptive monomers of the prior art.

The amount of polymer BDA attributable to end groups from the potassium persulfate-sulfur dioxide initiator may be calculated using the following equation:

$$BDA = 2.48 + 0.714\left(\frac{1}{\eta_{sp}} + 0.24\right)^{4/3}$$

Hence by taking into account the $\eta_{sp}$ of the polymer, it is possible to assign the proportion of the BDA due to the incorporation of the acidic monomer.

TABLE

| | Sp. | Wt. percent acid mon. | Pol. BDA | BDA end-groups | BDA acid mon. | BDA wt. percent acid mon. | Ave. |
|---|---|---|---|---|---|---|---|
| SMS | .144 | 0.6 | 16.1 | 12.4 | 3.7 | 6.2 | |
| SMS | 1.161 | 0.6 | 15.2 | 11.0 | 4.2 | 7.0 | 7.0 |
| SMS | .163 | 0.6 | 15.5 | 10.9 | 4.6 | 7.7 | |
| PVBS | .171 | 0.4 | 15.9 | 10.4 | 5.5 | 13.7 | 11.8 |
| PVBS | .163 | 0.4 | 14.9 | 10.9 | 4.0 | 10.0 | |
| SSMA | .174 | 0.6 | 16.0 | 10.3 | 5.7 | 9.5 | |
| SSMA | .162 | 0.6 | 18.3 | 11.0 | 7.3 | 12.2 | 10.8 |
| SSMA | .162 | 0.6 | 17.4 | 11.0 | 6.4 | 10.7 | |
| SVOBS | .152 | 0.5 | 11.5 | 11.7 | 0 | 0 | 0.7 |
| SVOBS | .170 | 1.0 | 11.9 | 10.5 | 1.4 | 1.4 | |
| SAOBS | .166 | 0.5 | 12.3 | 10.7 | 1.6 | 3.2 | 3.9 |
| SAOBS | .207 | 1.0 | 13.3 | 8.7 | 4.6 | 4.6 | |
| SMOBS | .170 | 0.5 | 19.0 | 10.5 | 8.5 | 17.0 | |
| SMOBS | .168 | 0.5 | 18.8 | 10.6 | 8.2 | 16.4 | 15.4 |
| SMOBS | .151 | 0.4 | 17.0 | 11.8 | 5.2 | 13.0 | |
| SMOBS | .192 | 0.3 | 13.8 | 9.3 | 4.5 | 15.0 | |
| NMOBS | .183 | 0.5 | 14.9 | 9.8 | 5.1 | 10.2 | |
| MMOBS | .175 | 0.5 | 15.7 | 10.2 | 5.5 | 11.0 | |
| MSMOBS | .194 | 0.5 | 14.8 | 9.2 | 5.6 | 11.2 | |
| SMMOBS | .142 | 0.5 | 18.2 | 12.6 | 5.6 | 11.2 | |

SMS—sodium methyallylsulfonate, PVBS—potassium vinylbenzenesulfonate, SMOBS—sodium p-methallyloxybenzenesulfonate, NMOBS—ammonium p-methallyloxybenzenesulfonate, MMOBS—magnesium p-methallyloxybenzenesulfonate, MSMOBS—sodium m-methallyloxybenzenesulfonate, SMMOBS—sodium 5-methyl-2-methallyloxybenzenesulfonate, SSMA—sodium p-sulfophenylmethacrylamide, SVOBS—sodium vinyloxybenzenesulfonate, SAOBS—sodium p-allyloxybenzenesulfonate.

A perusal of the above table shows that the alkyl allyloxybenzenesulfonates of the present invention are equivalent or superior to those of the prior art and are markedly better than the other phenolic ethers.

The compositions of the instant invention may be prepared in a varying temperature range depending on the polymerization process employed. Preferably the temperature will vary from 40–60° C. Any suitable initiator system may be employed such as the water-soluble peroxy compounds, for example, the potassium, sodium, ammonium and other water-soluble salts of peroxy acids, hydrogen peroxide, sodium perborate. Reducing agents useful with these peroxy compounds include sulfur dioxide, sodium bisulfite, titanous sulfate, sodium formaldehyde sulfoxylate, formamidine sulfinic acid, etc. Other compounds which undergo thermal decomposition to yield free radicals may also be used such as azo-bis-isobutyronitrile, benzoyl peroxide, lauroyl peroxide and the like. A wide variation, from about 0.1 to 3 percent by weight in the amount of initiator is possible.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

I claim:
1. As a new composition of matter a polymer comprising at least 80 percent acrylonitrile, up to 19.90 percent of at least one other copolymerized mono-olefinic monomer and from 0.1 to 10 percent by weight of a compound in polymerized form having the general formula:

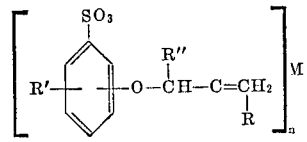

where R is lower alkyl of 1 to 6 carbon atoms, R' and R'' may be hydrogen or lower alkyl of 1 to 6 carbon atoms, M represents hydrogen or a mono- or divalent salt forming member, and $n$ is an integer equal to the valence of the cation M.

2. The composition of matter of claim 1 wherein R is methyl and R' and R'' are hydrogen.
3. The composition of matter of claim 1 wherein R and R' are methyl and R'' is hydrogen.
4. The composition of matter of claim 1 wherein R and R' are ethyl and R'' is hydrogen.
5. The composition of matter of claim 1 wherein M is sodium and $n$ is one.
6. The composition of matter of claim 1 wherein M is ammonium.
7. The composition of matter of claim 1 wherein M is potassium.
8. The composition of matter of claim 1 wherein M is magnesium.
9. The composition of matter of claim 1 wherein the compound is ammonium p-methallyloxybenzenesulfonate.
10. The composition of matter of claim 1 wherein the compound is sodium p-methallyloxybenzenesulfonate.
11. The composition of matter of claim 1 wherein the compound is magnesium p-methallyloxybenzenesulfonate.
12. The composition of matter of claim 1 wherein the compound is sodium 5-methyl-2-methallyloxybenzenesulfonate.
13. The composition of matter of claim 1 wherein the compound is sodium m-methallyloxybenzenesulfonate.
14. The composition of matter of claim 1 wherein the copolymerized mono-olefinic monomer is vinyl acetate.
15. As a new composition of matter a copolymer comprising at least 80 percent acrylonitrile and from 0.1 to 10 percent by weight of an alkyl allyloxybenzenesulfonate.
16. As a new composition of matter a polymer comprising at least 80 percent acrylonitrile, up to about 19.5 percent of vinylidine chloride and from 0.1 to 10 percent by weight of p-methallyloxybenzenesulfonate.
17. As a new composition of matter a terpolymer comprising from 80 to 98 percent of acrylonitrile, up to about 19.5 percent of vinyl acetate and from 0.5 to 2.0 percent of p-methallyloxybenzenesulfonate.
18. As a new composition of matter a tetrapolymer comprising from about 85 to 92.9 percent of acrylonitrile, from about 4 to 9 percent vinyl acetate, from about 2 to 5 percent vinyl bromide and from about 0.1 to 1.0 percent p-methallyloxybenzenesulfonate.

19. As a new composition of matter a polymer comprising a blend of 80 to 99 percent of (A) a terpolymer containing 90 to 98 percent of acrylonitrile, 2 to 9 percent of vinyl acetate, and 0.1 to 8 percent of an alkyl allyloxybenzenesulfonate copolymerized therewith, and from 1 to 20 percent of (B) a copolymer containing 10 to 70 percent of acrylonitrile and 30 to 90 percent of a vinyl substituted tertiary heterocyclic amine coypolymerized therewith, said blend having an overall vinyl-substituted tertiary heterocyclic amine content of from 2 to 10 percent based on the weight of the blend.

20. The composition of matter of claim 1 in the form of a filament.

21. The composition of matter of claim 1 in the form of a shaped article.

22. A process for the preparation of a polymer containing at least 80 percent acrylonitrile, up to 19.90 percent of at least one other copolymerized mono-olefinic monomer and from 0.1 to 10 percent by weight of a compound having the general formula:

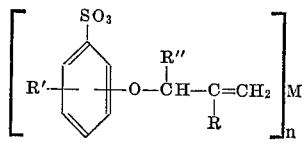

where R is lower alkyl of 1 to 6 carbon atoms, R' and R" may be hydrogen or lower alkyl of 1 to 6 carbon atoms, M represents hydrogen or a mono- or divalent salt forming member, and $n$ is an integer equal to the valence of the cation M, comprising adding the monomers to an aqueous medium at a temperature of from 40 to 60° C. in the presence of a combination consisting of water soluble peroxy compound and a reducing agent, said combination being capable of producing free radicals.

References Cited

UNITED STATES PATENTS

| | | | |
|---|---|---|---|
| 2,436,204 | 2/1948 | D'Alelio | 260—85.5 |
| 2,437,508 | 6/1944 | D'Alelio | 260—85.5 |
| 2,613,195 | 9/1950 | Craig | 260—30.8 |
| 3,049,512 | 8/1962 | Fournet et al. | 260—49 |

SAMUEL H. BLECH, *Primary Examiner.*

M. J. TULLY, *Assistant Examiner.*

U.S. Cl. X.R.

260—47, 49, 79.3, 79.7, 80.76

UNITED STATES PATENT OFFICE
CERTIFICATE OF CORRECTION

Patent No. 3,426,104

February 4, 1969

James C. Masson

It is certified that error appears in the above identified patent and that said Letters Patent are hereby corrected as shown below:

Column 2, line 3, "budidium ions, an" should read -- rubidium ions, an --; line 33, "sodium-5-methyl-" should read -- sodium-4-methyl- --. Column 7, lines 70 to 75, the formula should appear as shown below:

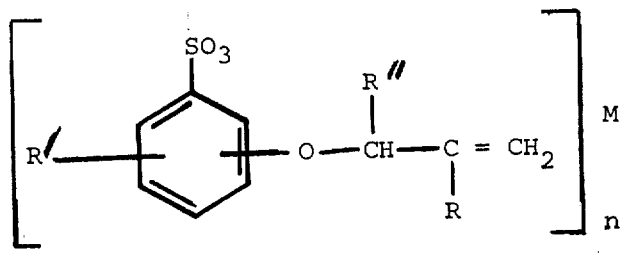

Signed and sealed this 14th day of April 1970.

(SEAL)
Attest:

EDWARD M. FLETCHER, JR.
Attesting Officer

WILLIAM E. SCHUYLER, JR
Commissioner of Patents